United States Patent [19]

Rieben et al.

[11] Patent Number: 4,842,808
[45] Date of Patent: Jun. 27, 1989

[54] NUCLEAR FUEL PELLET COLLATING SYSTEM

[75] Inventors: Stuart L. Rieben; Ralph W. Kugler, both of Pittsburgh, Pa.; Joseph J. Scherpenberg, Columbia, S.C.; Dale T. Wiersema, Florence, S.C.; James L. Fogg, Columbia, S.C.

[73] Assignee: Westinghouse Electric Corp., Pittsburgh, Pa.

[21] Appl. No.: 172,827

[22] Filed: Mar. 25, 1988

[51] Int. Cl.⁴ .................... G21C 19/00; G21C 21/00; B65B 1/04
[52] U.S. Cl. .................... 376/261; 53/154; 53/237; 53/244; 53/247; 29/711; 414/146
[58] Field of Search .................. 376/261, 260; 29/723, 29/400 N, 711, 799; 414/63, 98, 110, 146; 53/244, 247, 252, 148, 500, 531, 532, 542, 504, 237, 154, 543

[56] References Cited

U.S. PATENT DOCUMENTS

| | | | |
|---|---|---|---|
| 3,226,833 | 1/1966 | Lemelson | 33/143 |
| 3,897,673 | 8/1975 | Kee et al. | 376/261 |
| 3,940,908 | 3/1976 | Dazen et al. | 53/258 |
| 4,158,601 | 6/1979 | Gerkey | 376/261 |
| 4,193,502 | 3/1980 | Marmo | 209/555 |
| 4,203,696 | 5/1980 | Lindberg | 414/331 |
| 4,235,066 | 11/1980 | King et al. | 29/723 |
| 4,349,112 | 9/1982 | Wilks et al. | 209/538 |
| 4,373,804 | 2/1983 | Pryor et al. | 356/1 |
| 4,409,718 | 10/1983 | Pryor | 29/407 |
| 4,468,163 | 8/1984 | King et al. | 414/21 |
| 4,495,146 | 1/1985 | Gheri | 376/261 |
| 4,543,702 | 10/1985 | Wada | 29/711 |
| 4,545,106 | 10/1985 | Juengel | 29/563 |
| 4,566,835 | 1/1986 | Raymond et al. | 414/53 |
| 4,651,074 | 3/1987 | Wise | 318/640 |
| 4,720,958 | 1/1988 | Wright et al. | 53/252 |
| 4,748,798 | 6/1988 | Udaka et al. | 376/261 |
| 4,762,665 | 8/1988 | Billington et al. | 376/261 |

FOREIGN PATENT DOCUMENTS

| | | |
|---|---|---|
| 2900865 | 7/1979 | Fed. Rep. of Germany . |
| 3310755 | 9/1984 | Fed. Rep. of Germany . |
| 3345920 | 6/1985 | Fed. Rep. of Germany . |
| 61-4999 | 1/1986 | Japan . |

*Primary Examiner*—Harvey E. Behrend
*Assistant Examiner*—Daniel Wasil

[57] ABSTRACT

A pellet collating system includes a tray positioning station located adjacent a pellet collating line with a tray transfer robot located therebetween. The tray positioning station has mobile carts lodged thereat, some supporting pellet supply trays and others supporting pellet storage trays. Pellets on one supply tray and later placed on one storage tray are of the same enrichment. Pellet enrichments on some trays are different from on others. The collating line includes pellet input, work and output stations arranged in tandem. The robot is operable to transfer supply and storage trays one at a time to and from the positioning station and the respective input and output stations. An input sweep head is operable for sweeping pellets onto the work station from a supply tray on the input station. A gripping and measuring head is operable for measuring a desired length of pellets on the work station and then separating the measured desired length of pellets from the remaining pellets, if any. An output sweep head is operable for sweeping the measured lengths of pellets from the work station onto a storage tray at the output station. The output sweep head is also operable for sweeping the remaining pellets, if any, from the work station back onto the one supply tray disposed at the input station.

30 Claims, 14 Drawing Sheets

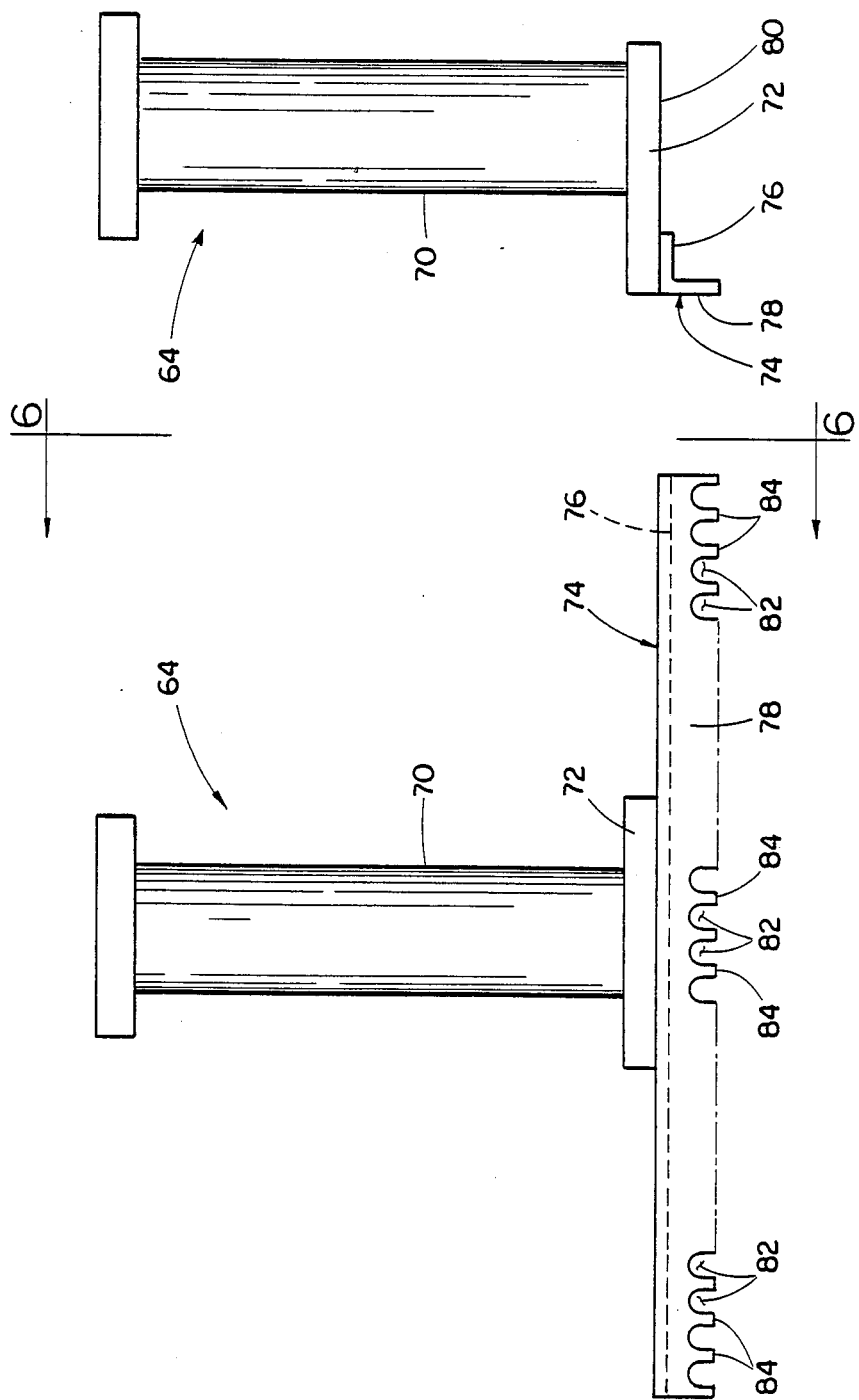

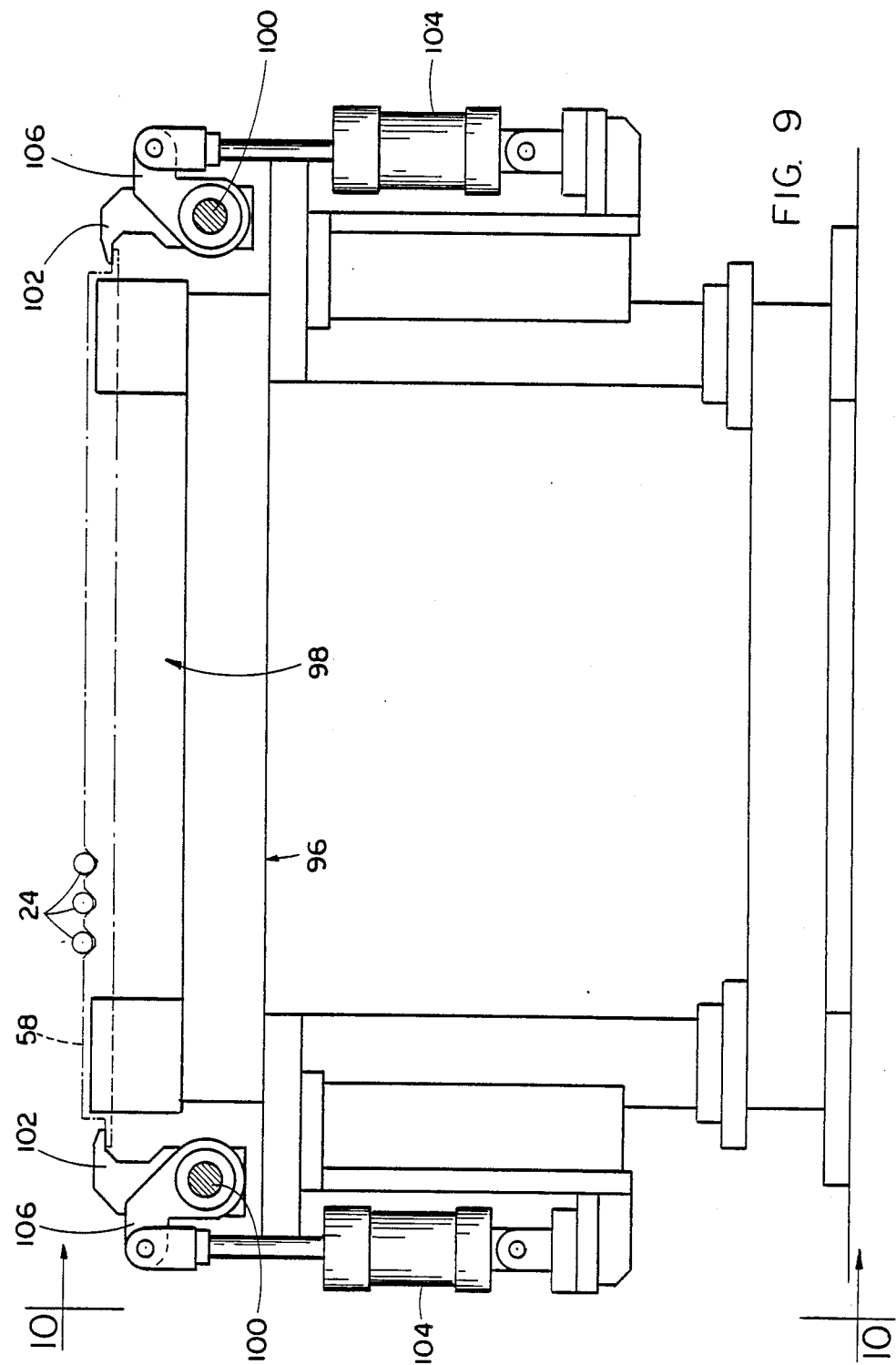

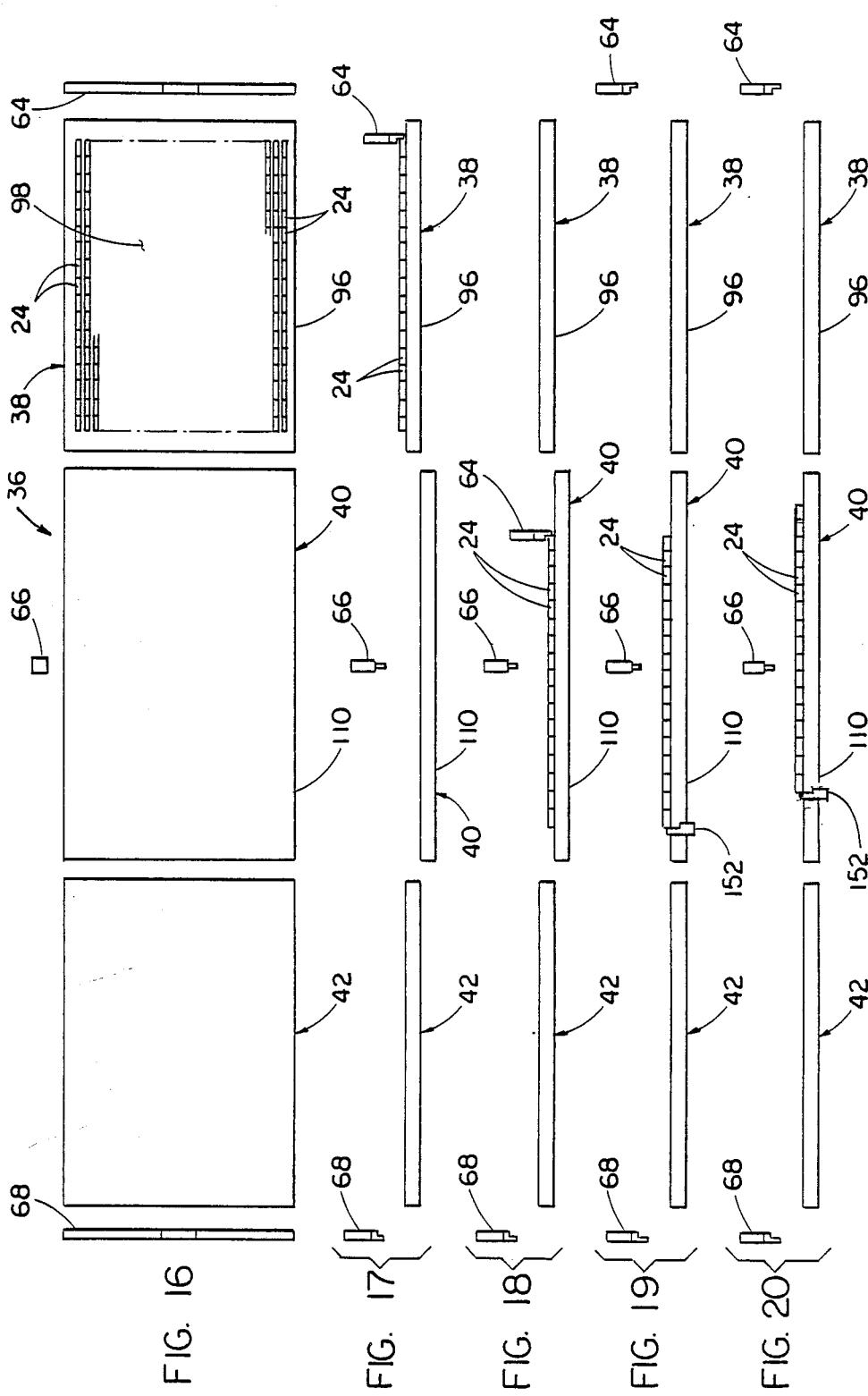

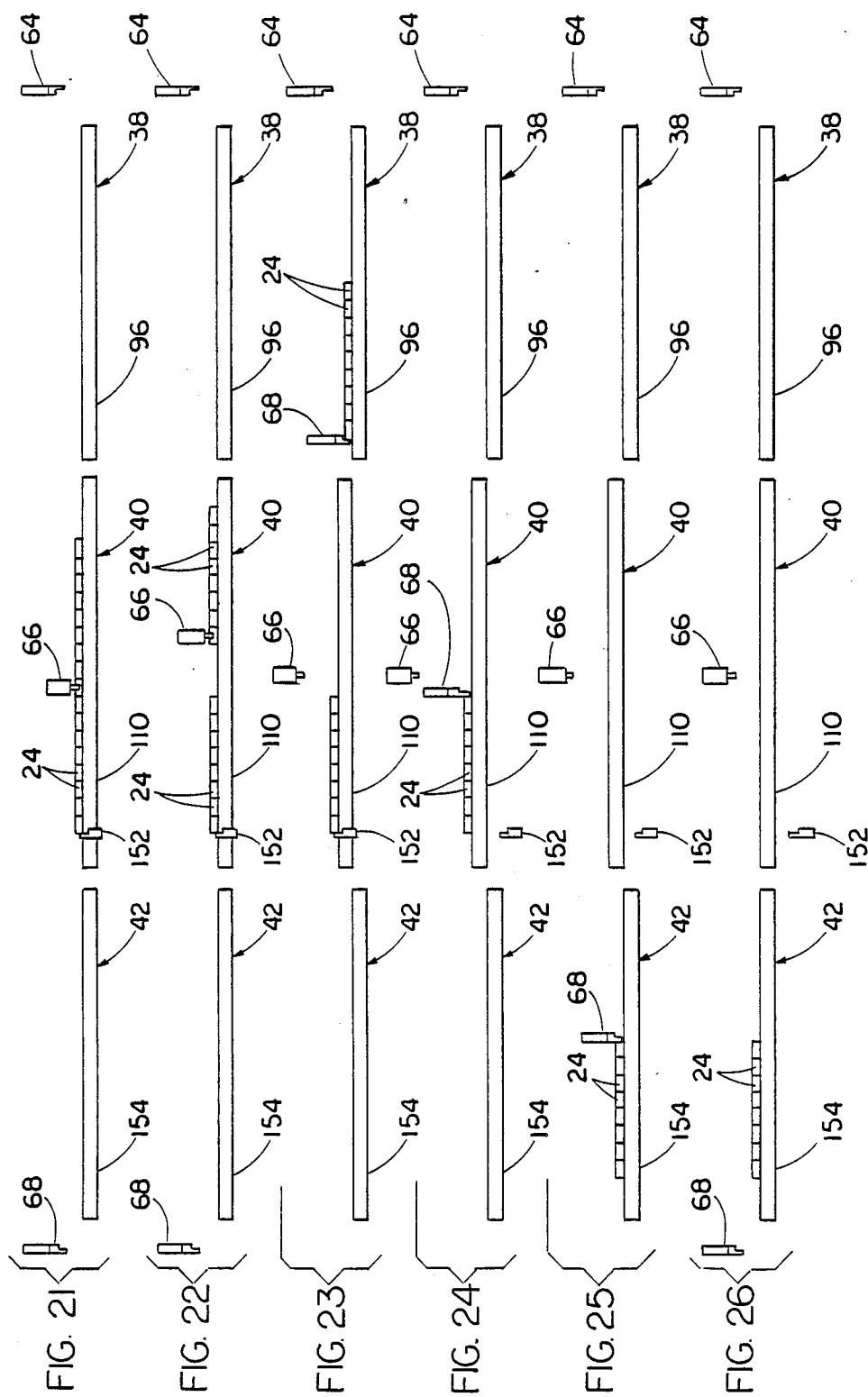

NUCLEAR FUEL PELLET COLLATING SYSTEM

BACKGROUND OF THE INVENTION

1. Field of the Invention

The present invention relates generally to nuclear fuel rods for use in nuclear reactors and, more particularly, is concerned with a system and method for collating nuclear fuel pellets so as to facilitate subsequent filling of fuel rods with pellets in multiple zones of different nuclear fuel enrichments.

2. Description of the Prior Art

In a typical nuclear reactor, the reactor core includes a large number of elongated fuel assemblies. Conventional designs of these fuel assemblies include top and bottom nozzles with a plurality of elongated transversely spaced guide thimbles extending longitudinally between and connected at opposite ends to the nozzles and a plurality of transverse support grids axially spaced along the guide thimbles. Also, each fuel assembly is composed of a multiplicity of elongated fuel elements or rods transversely spaced apart from one another and from the guide thimbles and supported by the transverse grids between the top and bottom nozzles.

The fuel rods each contain fissile material in the form of a plurality generally cylindrical nuclear fuel pellets maintained in a row or stack thereof in the rod. The fuel rods are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Up to the present time, generally a given fuel rod has been filled with nuclear fuel pellets of the same enrichment. In filling a typical fuel rod, pellets of the same enrichment are continually fed from supply trays into the fuel rod until the specified depth of fill has been achieved. The supply trays are used up completely. A partial tray left after completing a batch of twenty-five fuel rods is used to start the fill of the next batch. Various systems have been used in the past to fill the fuel rods with fuel pellets. Representative of the prior art are the systems disclosed in U.S. Pat. Nos. to Gerkey (4,158,601)—assigned to the assignee of the present invention—and Gheri (4,495,146), and Japanese Pat. No. 61-4999 to Mitsubishi.

Recently, nuclear fuel rods with pellets in multiple zones of different enrichments have been introduced. These new zoned fuel rods contain short lengths of "blanket" pellets at each end. The fuel rods additionally have pellets grouped within from three to five zones of different enrichments between the end zones of blanket pellets. Pellets for filling these enrichment-zoned fuel rods will first need to be assembled into the desired sequences of enrichment zones before filling of the fuel rods can commence.

One approach to assembling fuel pellets in the desired sequence of enrichment zones for filling a fuel rod is by manual effort. However, this approach envisions individual handling of each pellet which is highly labor-intensive and time-consuming and subject to human error. A much more desirable approach is to assemble the different zones of fuel pellet by use of a highly-mechanized and automated system which would be substantially free of human error.

Consequently, a need exists for an automated system capable of assembling pellets of different enrichments into the desired sequence of enrichment zones of pellets so that specified sequences of pellets will be produced for subsequent loading into fuel rods.

SUMMARY OF THE INVENTION

The present invention provides a fuel pellet collating system and method designed to satisfy the aforementioned needs. The collating system and method of the present invention is adapted to handle and transfer trays of pellets of various enrichments, to measure, record, and sum the lengths of the various pellet zones, and to load these measured rows or stacks of zoned pellets into a collated storage and transport cabinet so that pellets in the specified sequence of enrichment zones will be subsequently loaded into the fuel rods. In the pellet collating system and method of the present invention, a multiplicity of rows of pellets, for instance twenty-five rows, are handled simultaneously.

Accordingly, the present invention is directed to a system of collating nuclear fuel pellets which comprises: (a) means for positioning a plurality of pellet supply trays and a plurality of pellet storage trays, each supply tray being adapted to support in at least one row thereon a plurality of pellets of an enrichment different from the enrichments of pellets on at least some other of said supply trays, each storage tray being adapted to support in at least one row thereon a plurality of pellets of an enrichment different from the enrichments of pellets on at least some other of said storage trays; (b) a pellet collating line including a serially-arranged pellet input station, pellet measuring and collating work station and pellet output station; (c) means for transferring supply trays one at time between the tray positioning means and the input station and for transferring storage trays one at a time between the tray positioning means and the output station; and (d) pellet collating means disposed adjacent the pellet collating line and being operable for moving pellets in the at least one row thereof onto the work station from a given one supply tray on the input station, for measuring a desired length of pellets on the work station and separating the measured length of pellets from the remaining pellets, if there be any, for moving the measured length of pellets from the work station onto a given one storage tray on the output station, and for moving the remaining pellets, if there be any, from the work station back onto the one given supply tray on the input station.

More particularly, the pellet collating means includes means in the form of an input sweep head disposed adjacent the input station and being operable for sweeping pellets in the at least one row thereof onto the work station from the one pellet supply tray on the input station, means in the form of a gripping and measuring head disposed adjacent the work station and being operable for measuring the desired length of pellets and separating the measured length of pellets from the remaining pellets, if there be any, and means in the form of an output sweep head disposed adjacent the output station and being operable for sweeping the measured length of pellets from the work station onto the one pellet storage tray on the output station. One of the input and output sweep heads and of the gripping and measuring head is also operable to sweep the remaining pellets, if there be any, from the work station back onto the one pellet supply tray on the input station.

Also, the present invention is directed to a method of collating nuclear fuel pellets which comprises the steps of: (a) supporting a plurality of pellet supply trays and a plurality of pellet storage trays at a tray positioning station, each of the supply trays supporting in at least one row thereon a plurality of nuclear fuel pellets of an enrichment different from the enrichments of pellets on at least some other of the supply trays, each of the storage tray being adapted to receive in at least one row thereon a plurality of nuclear fuel pellets of an enrichment different from the enrichments of pellets on at least some other of the storage trays; (b) transferring one supply tray from the tray positioning station and disposing the same on an input station of a pellet collating line; (c) transferring one storage tray from the tray positioning station and disposing the same on an output station of the pellet collating line; (d) sweeping pellets in the at least one row thereof from the one supply tray on the input station onto a work station of the pellet collating line located between the input and output stations thereof; (e) measuring a desired length of pellets in the at least one row thereof on the work station and separating the measured length of pellets from the remaining pellets, if there be any, in the row thereof; (f) sweeping the remaining pellets, if there be any, in the row thereof from the work station back onto the one supply tray on the input station; (g) transferring the one supply tray and remaining pellets, if there be any, thereon from the input station back to the tray support station; (h) sweeping the measured length of pellets from the work station onto the one storage tray on the output station; and (i) transferring the one storage tray and measured length of pellets thereon from the output station back to the tray positioning station.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 5 is an enlarged front elevational view of an input sweep head as seen along line 5—5 of FIG. 3.

FIG. 6 is an end elevational view of the input sweep head as seen along line 6—6 of FIG. 5.

FIG. 9 is an enlarged end elevational view of an input station of the system of FIGS. 3 and 4.

FIGS. 16 through 26 are schematic views of the pellet collating line of the system illustrating the sequence of steps of the method of collating pellets.

DETAILED DESCRIPTION OF THE INVENTION

Figure 1:
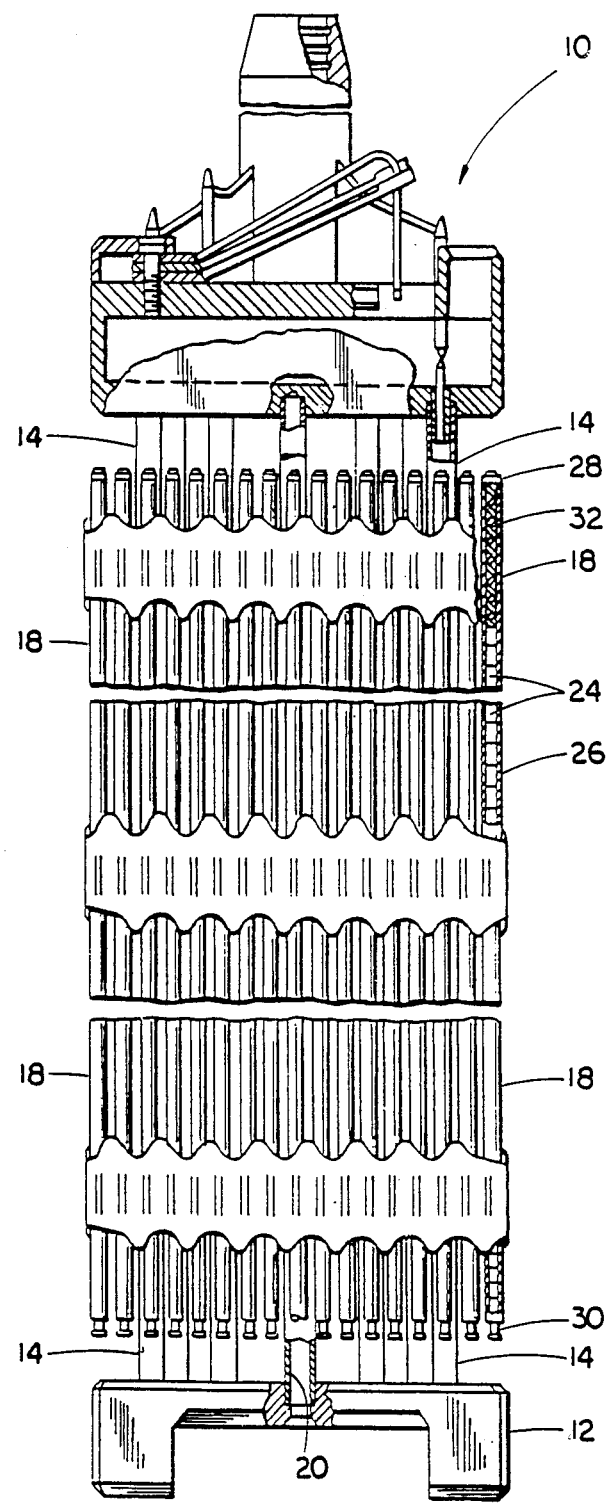
FIG. 1 is an elevational view, partly in section, of a fuel assembly which incorporates enrichment-zoned fuel rods whose multiple enrichment zones of nuclear fuel pellets have been collated by the system and method of the present invention.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particular to FIG. 1, there is shown an elevational view of a nuclear fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of the reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated nuclear fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

Figure 2:
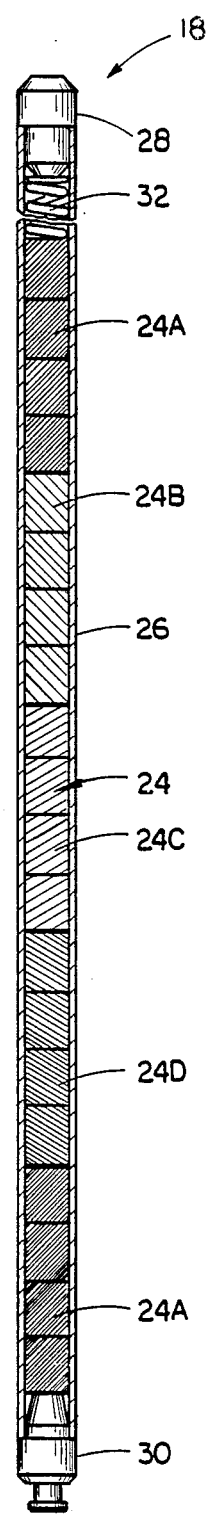
FIG. 2 is an enlarged longitudinal view of one of the enrichment-zoned fuel rods removed from the fuel assembly of FIG. 1, showing the fuel rod in vertically foreshortened and partly sectioned form.

Referring to FIG. 2, there is illustrated an axial cross-sectional view of one of the fuel rods 18 in the array thereof in the assembly 10. Each fuel rod 18 includes a plurality of nuclear fuel pellets 24 disposed in a stack in an elongated hollow cladding tube 26 having its opposite ends closed by upper and lower end plugs 28, 30 so as to hermetically seal the rod. Commonly, a plenum spring 32 is disposed within the cladding tube 26 between the upper end plug 28 and the pellets 24 to maintain the pellets in a tight, stacked relationship within the rod 18.

The fuel pellets 24 preferably are of different enrichments. Pellets having common enrichments are grouped or arranged in the same zones. For example, the enrichment-zoned fuel rod 18 depicted in FIG. 2 and employed in the fuel assembly 10 of FIG. 1 contains short zones of "blanket" pellets 24A of enrichment "x" at each end of the fuel rod and three zones of pellets 24B–24D of enrichments "w", "y" and "z" between the blanket zones of pellets 24A.

Pellet Collation System

Figure 3:
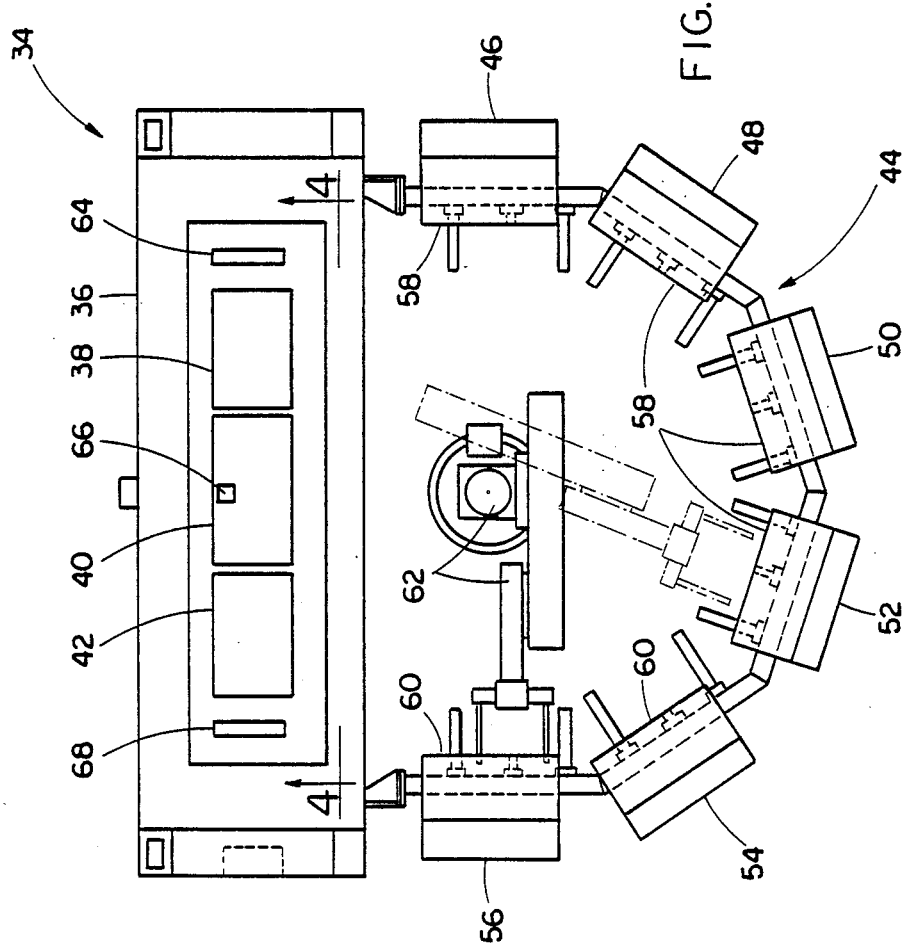
FIG. 3 is a pellet collating system of the present invention used for collating the pellets in the multiple enrichment zones thereof in the fuel rod of FIG. 2.

Turning now to FIG. 3, there is seen a system for collating nuclear fuel pellets, being generally designated 34 and constituting the preferred embodiment of the present invention. The pellet collating system 34 is operable for arranging the pellets 24A–D into rows thereof containing the above-described different enrichment zones. In its basic components, the pellet collating system 34 includes a pellet collating line 36 having pellet input, work and output stations 38–42 disposed in a serial arrangement, and a tray positioning station 44 located adjacent to the pellet collating line 36 and defining positions at which are lodged a plurality of mobile carts 46–56. The carts 46–52 each supports a plurality of pellet supply trays 58, whereas the carts 54, 56 each supports a plurality of pellet storage trays 60. Each of the trays 58, 60 has a plurality of corrugations or grooves (not shown) adapting it to support pellets 24 in multiple parallel rows thereof, for example twenty-five rows about twenty inches longs. All of the pellets 24 located on a given one of the trays has the same enrichment. However, the enrichments of pellets on some trays are different from on other trays so that all of the enrichments are represented for carrying out collating of the pellets in the different desired enrichment zones.

The pellet collating system 34 also includes a tray transfer mechanism, preferably a robot 62, located between the pellet collating line and the tray positioning station. The robot 62 is preferably a commercial device marketed under the trademark PUMA by Westinghouse Electric Corporation, the assignee of the present invention. The robot 62 is operable to rotate and to transfer the supply and storage trays 58, 60 one at a time between the respective carts 46–56 at the tray positioning station 44 and the respective input and output stations 38, 42.

Figure 4:
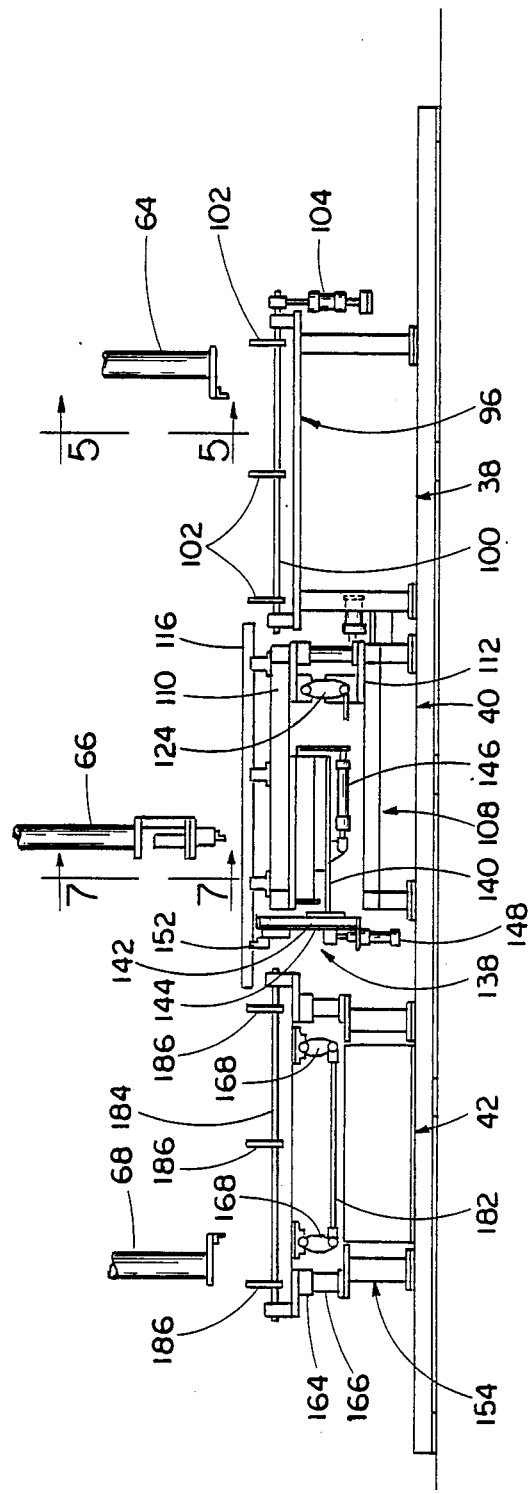
FIG. 4 is a pellet collating line as seen along line 4—4 of FIG. 3.

Referring now to FIG. 4, there is illustrated pellet collating means associated with the stations of the pellet collating line 36. The collating means includes an input sweep head 64, a gripping and measuring head 66 and an output sweep head 68. All of the heads 64–68 are mounted in depending relation from a superstructure (not shown) which disposes the heads above their respective input, work and output stations 38–42. The superstructure has suitable drive mechanism which are computer-controlled and connected to the heads 64–68 for moving them individually. The input and output sweep head 64,68 and the gripping and measuring head 66 are each movable in three orthogonal directions, vertically toward and away from their respective stations 38–42 (and thus between positions adjacent the stations or retracted away therefrom as seen in FIG. 4) and horizontally in orthogonal directions along and across the respective stations.

More particularly, the input sweep head 64 illustrated in detail in FIGS. 5 and 6 is substantially identical to the output sweep head 68 so a description of the former will suffice also for the latter. The input sweep head 64 (and also the output sweep head 68 not illustrated in detail) includes a vertical beam 70 having a horizontal plate 72 fixed to the lower end of the beam. The plate 72 has an elongated member 74 composed of a horizontal portion 76 and a vertical portion 78 being of right-angle configuration in cross-section. The horizontal member portion 76 is attached along one edge of the underside 80 of the plate 72 such that the vertical member portion 78 depends therefrom. A series of recesses 82 are cut out of the vertical member portion 78 to define a row of vertically-projecting fingers 84 being spaced apart by the same amount as the centers of adjacent rows of pellets 24 resting on the supply and storage trays 58, 60 are spaced apart. The fingers 78 are also aligned with such centers of the pellet rows such that movements of the input and output sweep heads 64, 68 longitudinally along the respective stations can employed to cause respective sweeping movements of the pellets in the multiple rows thereof simultaneously either from or to one supply tray 58 on the input station 38 to or from the work station 40 and from the work station 40 onto one storage tray 60 on the output station 42.

Figure 8:
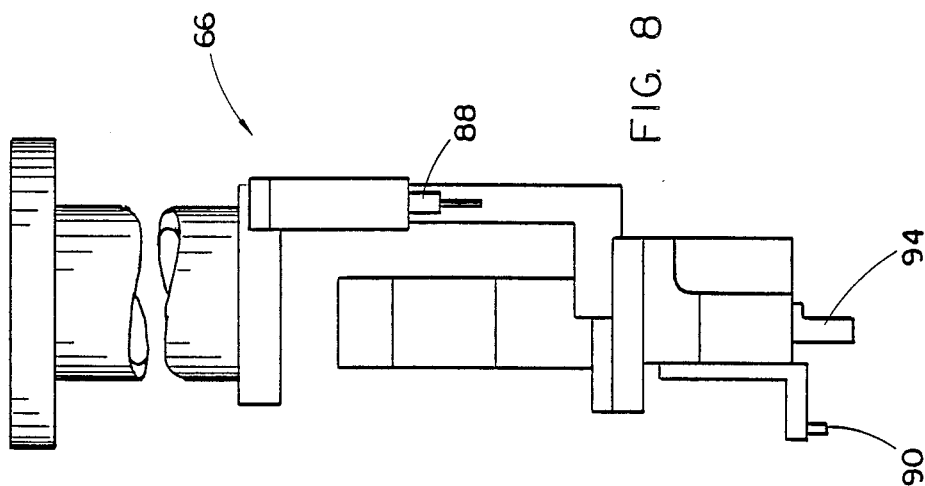
FIG. 8 is an end elevational view of the gripping and measuring head as seen along line 8—8 of FIG. 7.
Figure 7:
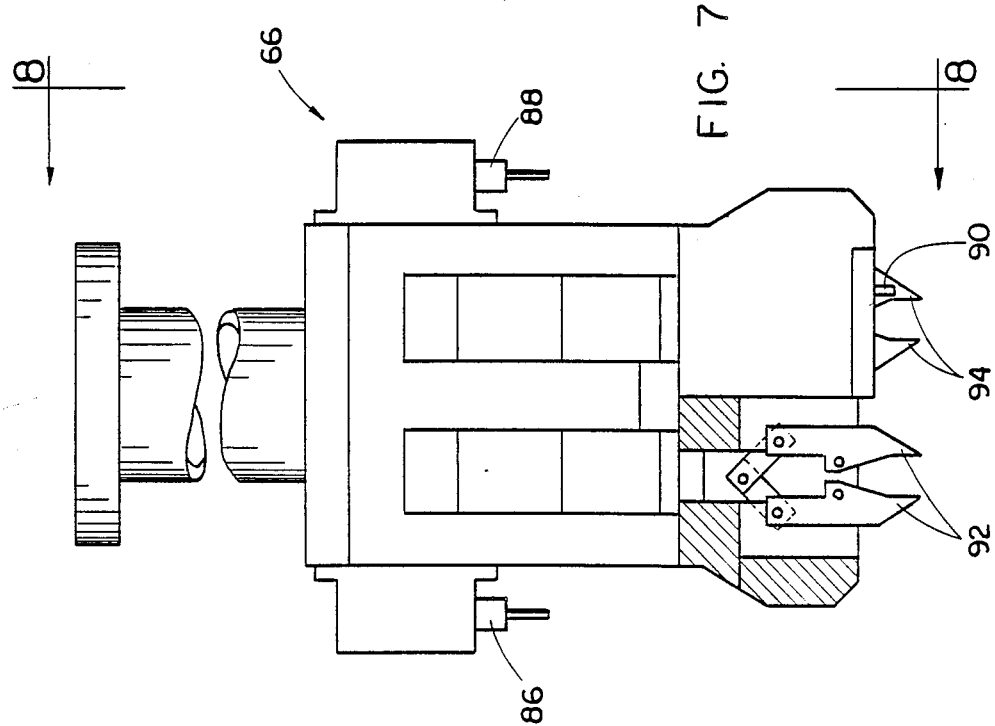
FIG. 7 is an enlarged front elevational view of a gripping and measuring head as seen along line 7—7 of FIG. 3.

As seen in FIGS. 7 and 8, the gripping and measuring head 66 includes three sensors 86–90 which detect the position of the head 66 at all times and provides information to a computer so that the position of the head 66 can be accurately controlled to carry out measurement of the lengths of pellets in the multiple rows thereof on the work station 40. The gripping and measuring head 66 also has two pairs of scissor-like gripping claws 92, 94 projecting downwardly, permitting the gripping of pellets in two adjacent rows to facilitate separation of the desired measured length of pellets in each of the two rows from the remaining pellets, if less than the total lengths of the two rows are to be measured in forming a zone of pellets of a particular enrichment from the pellets in the rows thereof.

Figure 10:
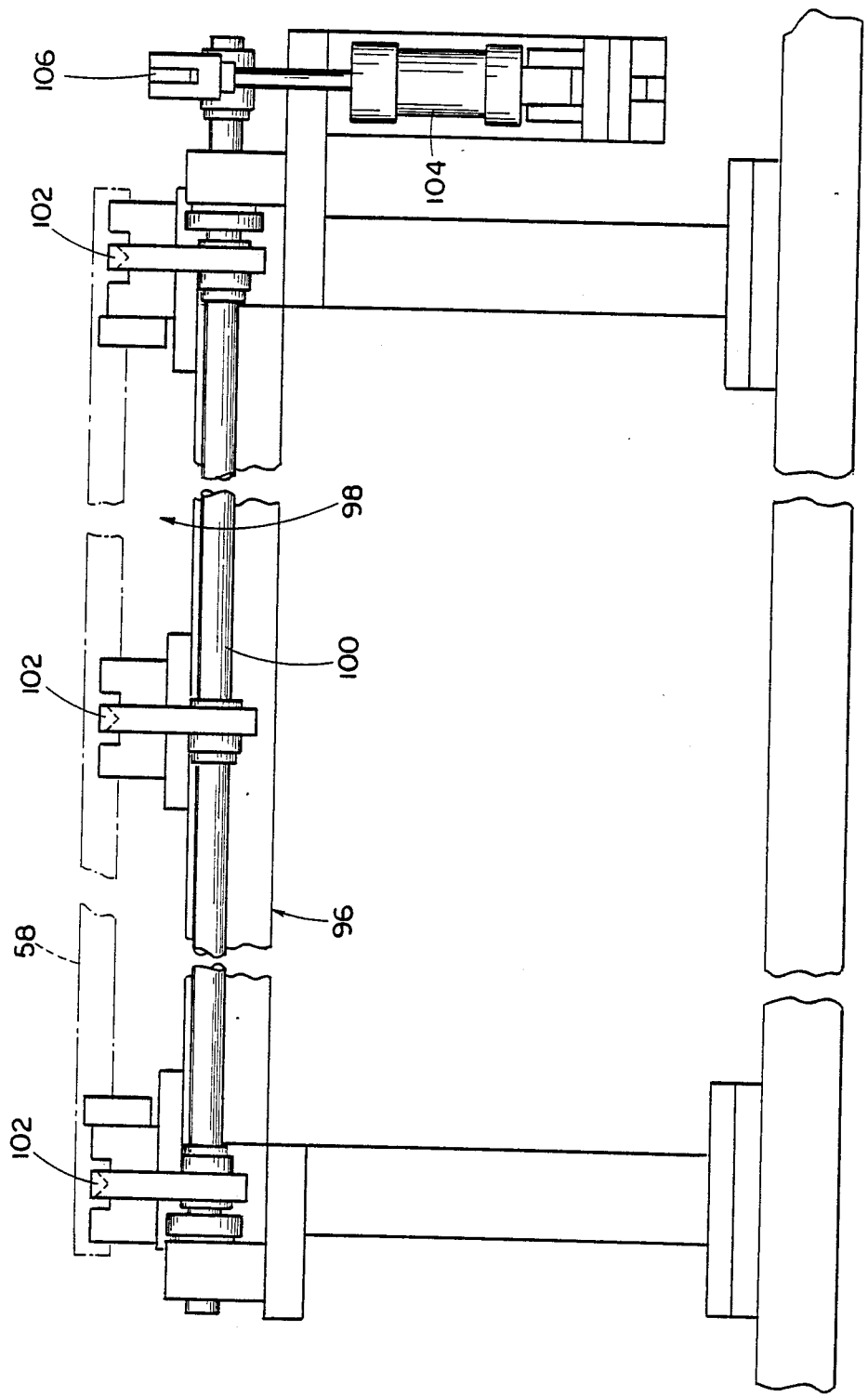
FIG. 10 is a side elevational view of the input station as seen along line 10—10 of FIG. 9.

Referring again to FIG. 4 and also to FIGS. 9 and 10, the input station 38 of the pellet collating line 36 includes a platform 96 having a tray supporting region 98 defined thereon and clamping means mounted on the platform 96 adjacent the region 98. The clamping means is in the form of a pair of shafts 100 each rotatably mounted to the platform 96 along a longitudinal side of the region 98, and a plurality of hook members 102 attached to each shaft 100. The hook members 102 pivot between unclamping and clamping positions relative to the platform region 98 upon rotation of each shaft 100. An actuator 104 is mounted on the platform 96 adjacent each of shaft 100 and coupled thereto by a crank 106. Each actuator 104, being in the form of an air cylinder, is extendable and retractable for rotating the respective shaft 100 and thereby pivoting the hook members 102 attached thereto between the clamping and unclamping positions. In the unclamping positions of the hook members 102, a supply tray 58 on the input station platform 96 is unclamped relative to the platform region 98 permitting transfer of the tray from and to the region. On the other hand, in the clamping positions of the hook members 102, the supply tray 58 is clamped on the platform region 98.

Figure 11:
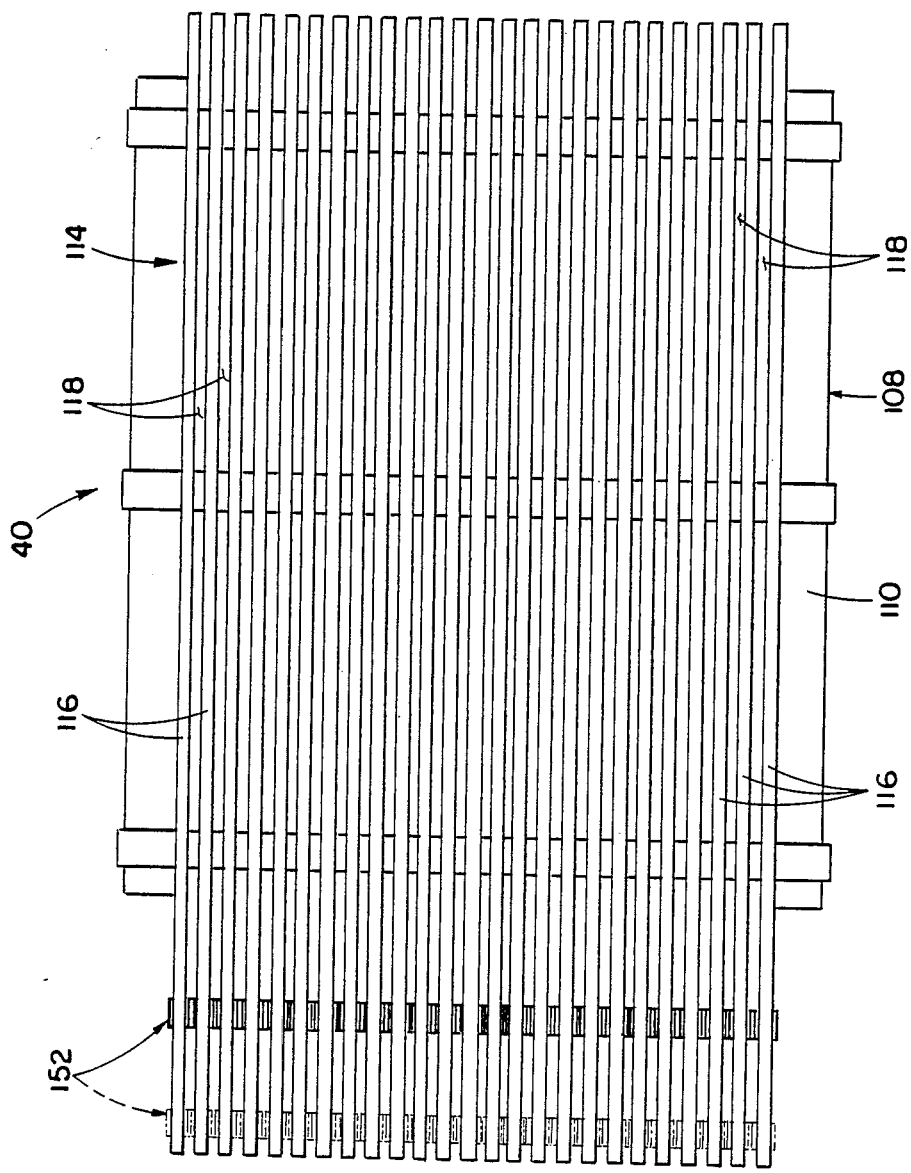
FIG. 11 is an enlarged top plan view of a work station of the system of FIGS. 3 and 4.
Figure 12:
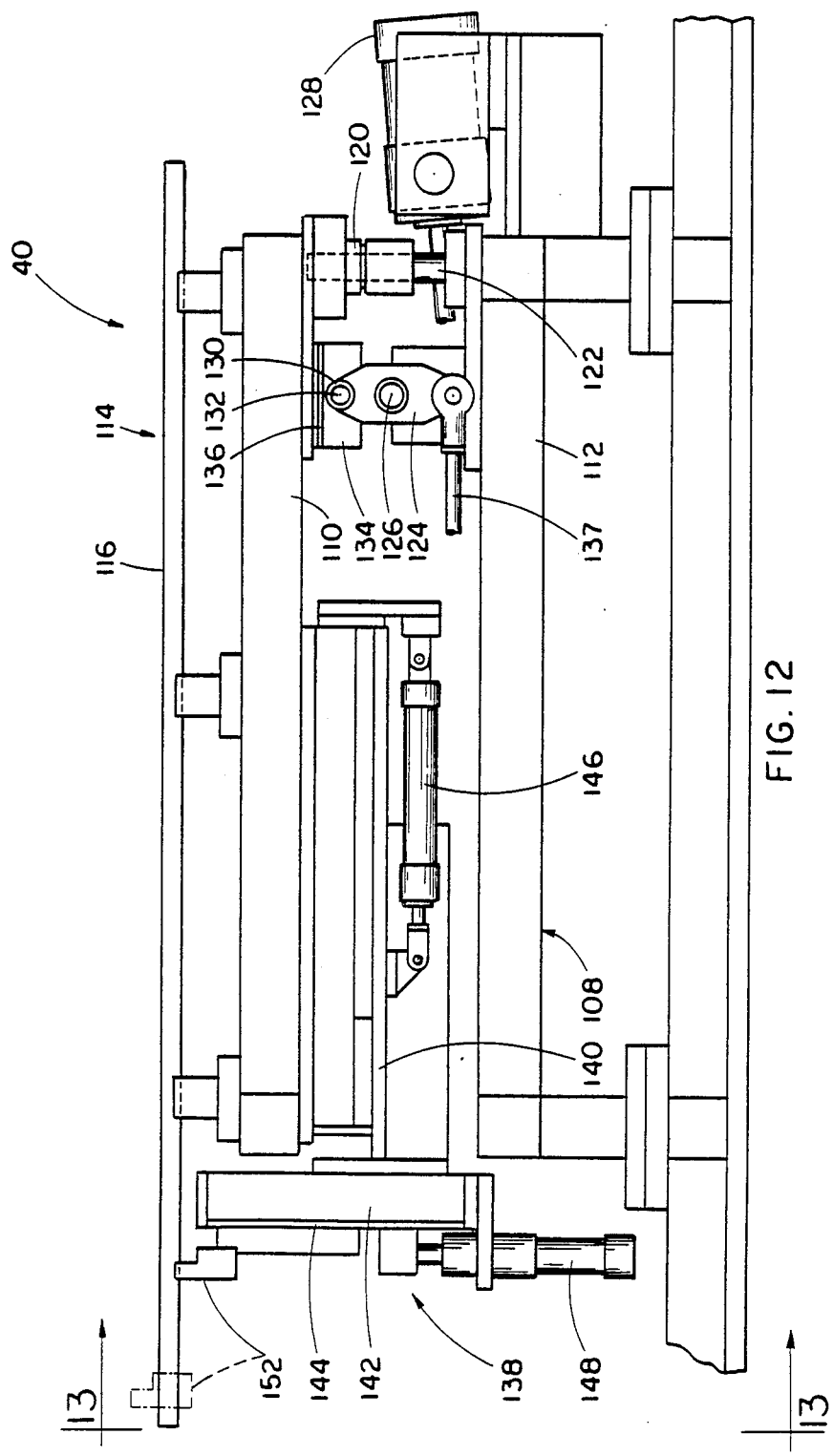
FIG. 12 is an enlarged side elevational view of the work station of FIGS. 3 and 4.
Figure 13:
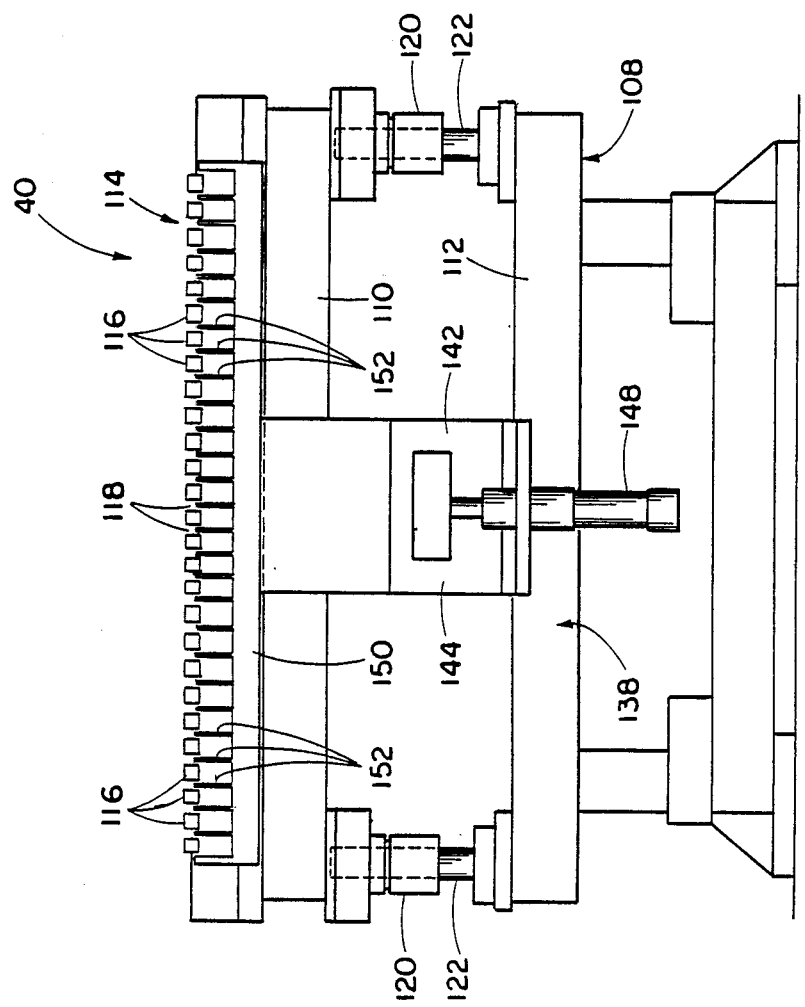
FIG. 13 is an end elevational view of the work station as seen along line 13—13 of FIG. 12.

Also as shown in FIG. 4 and in greater detail in FIGS. 11–13, the work station 40 of the pellet collating line 36 includes a platform 108 having separate upper and lower portions 110, 112, with the upper platform portion 110 having a region 114 for supporting the pellets 24 in the multiple rows thereof. The work station 40 also includes elevating means pivotally mounted on the lower portion 112 of the platform 108 and supporting the upper portion 110 thereof above the lower platform portion 112.

More particularly, the pellet supporting region 114 on the upper platform portion 110 is composed of a multiplicity of elongated generally parallel bar-like members 116 being spaced apart so as to define a multiplicity of open slots 118 between the members 116 having widths less than diameters of the pellets 24. The bar-like members 116 can be round in cross-section or have chamfered upper longitudinal edges which together with the slots 118 define channels on which to receive and support the pellets in the multiplicity of side-by-side rows thereof. The distance between the centers of adjacent channels is the same as the distance between the centers of the adjacent rows of pellets when resting on the supply tray 58 thereby permitting the pellets to slide from the corrugations of the supply tray directly onto the members 116 of the work station 40.

The upper and lower platform portions 110, 112 have telescoping support members 120, 122 respectively attached at each of their four corners by which arrangement the upper platform portion 110 is mounted for vertical movement relative to the lower platform portion 112. The elevating means is provided to lower and raise the upper platform portion 110 of the work station 40 in order to properly position the work station 40 relative to the input and output stations 38, 42 to facilitate slidably moving the pellets from a supply tray 58 on the input station 38 onto the bar-like members 116 of the work station 40, and eventually from the bar-like members 116 of the work station 40 onto a storage tray 60 on the output station 42.

Specifically, the elevating means includes a pair of pivotal lift arms 124 extending between the upper and lower platform portions 110, 112 at each opposite end thereof, a pair of shafts 126 each rotatably mounted on the lower platform portion 112 and extending between and attached to one of the pairs of lift arms 124, and an extendable and retractable actuator 128 coupled to one of the shafts 126 by a crank arm (not shown). Only the lift arm 124 at the right end of the work station 40 is shown in FIGS. 4 and 12. Each of the lift arms 124 has a roller 130 rotatably journaled by a stub shaft 132 to its upper end. The roller 130 is captured in a channel 134 attached to the upper platform portion 110 with an upper flange 136 of the channel 134 resting on the roller. In such manner, the upper platform portion 110 at each of its corners is movably supported on one lift arm 124. The lift arms 124 located on the same longitudinal sides of the work station 40 are pivotally interconnected at their lower ends by a connecting rod 137 so as to pivot in unison.

Thus, upon extension and retraction of the actuator 128, the shafts 126 are respectively rotated clockwise and counterclockwise causing corresponding pivoting of the lift arms 124 and lowering and raising of the upper platform portion 110 relative to the stationary lower platform portion 112. In the lowered position of the work station 40, the pellet supporting region 114 on the upper platform portion 110 is located at an elevation slightly below that of the one supply tray 58 on the input station 38 for facilitating movement of the pellets 24 from the supply tray 58 onto the work station 40. On the other hand, in the raised position of the work station 40, the pellet supporting region 114 on the upper platform portion 110 is located at an elevation slightly above that of the one storage tray 60 on the output station 42 for facilitating movement of the pellets from the work station 40 onto the storage tray 60.

Further, as seen in FIGS. 11-13, the work station 40 includes a pellet alignment mechanism 138 operable to align the leading pellets in the rows thereof with one another in order to provide an accurate zero position for facilitating measuring desired lengths of pellets in the rows by use of the gripping and measuring head 66. The alignment mechanism 138 includes a horizontally-slidable member 140 mounted to the underside of the upper platform portion 110 for horizontal reciprocatory sliding movement, a mast 142 mounted to the forward end of the horizontal slide member 140, a vertically-slidable member 144 mounted to the front side of the mast 142 for vertical reciprocatory sliding movement, a horizontal extendable and retractable actuator 146 connected between the horizontal slide member 140 and the upper platform portion 110 and a vertical extendable and retractable actuator 148 mounted on the mast and connected to the vertical slide member 144. At the upper end of the vertical slide member 144 is mounted a transverse member 150 having a multiplicity of upstanding spaced apart alignment elements or fingers 152 mounted thereon.

By coordinated extension and retraction of the actuators 146, 148, the vertical slide member 144 can be moved toward or away from, and the horizontal slide member 140 can be moved along, the bar-like members 116 for respectively projecting the alignment fingers 152 upwardly through the respective slots 118 and above the bar-like members 116 or retracting the alignment fingers 152 downwardly through the slots 118 and below the bar-like members 116, and moving the alignment fingers 152 along the slots 118 toward and away from the pellets 24 supported by the bar-like members 116. With such degree and range of movements, the alignment fingers 152 can be placed in contact with a leading one of the pellets in each of the multiple rows thereof to establish a zero position for measuring of the desired length of the pellets, as will be described later.

Figure 14:
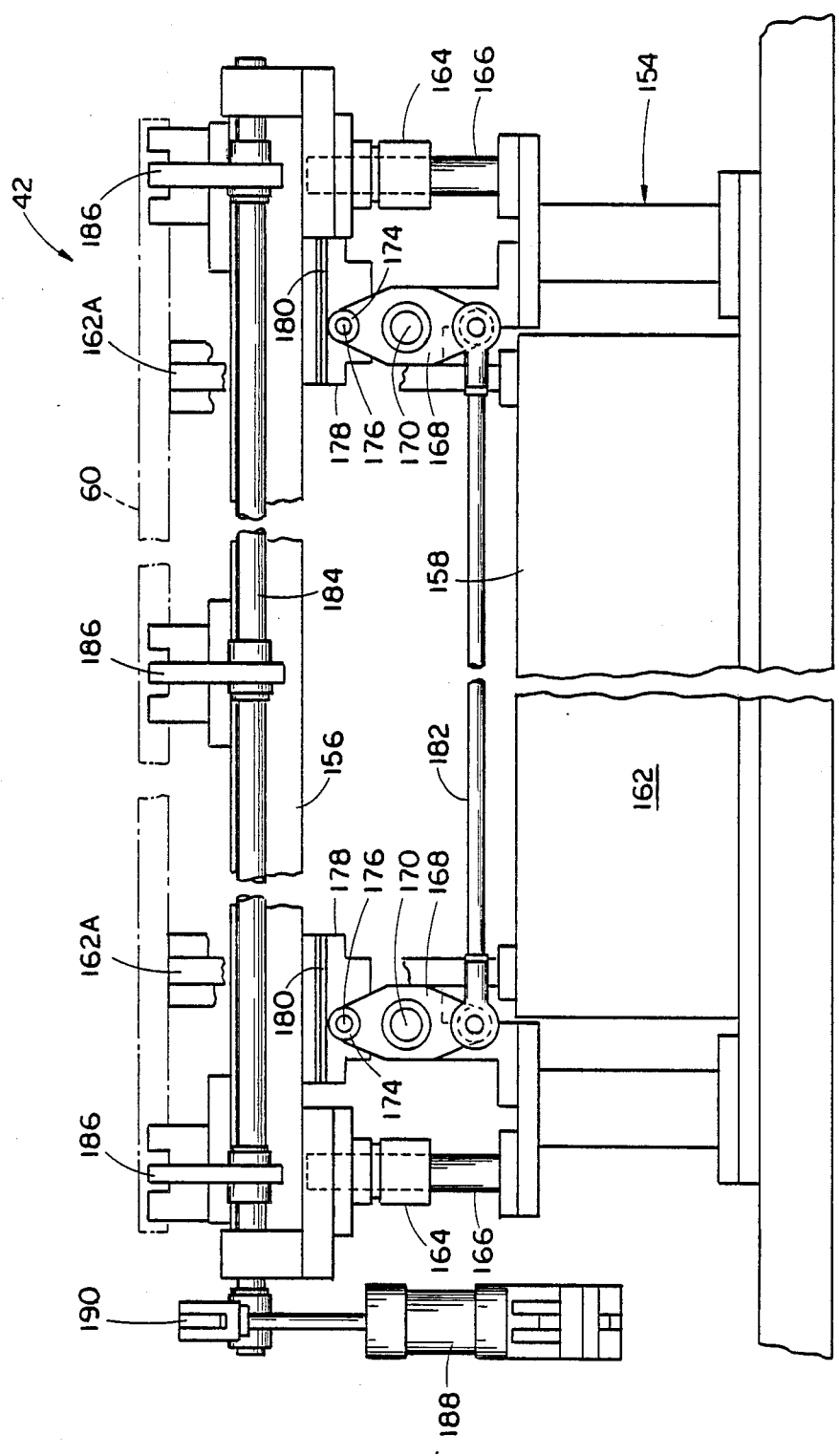
FIG. 14 is an enlarged side elevational view of an output station of the system of FIGS. 3 and 4.
Figure 15:
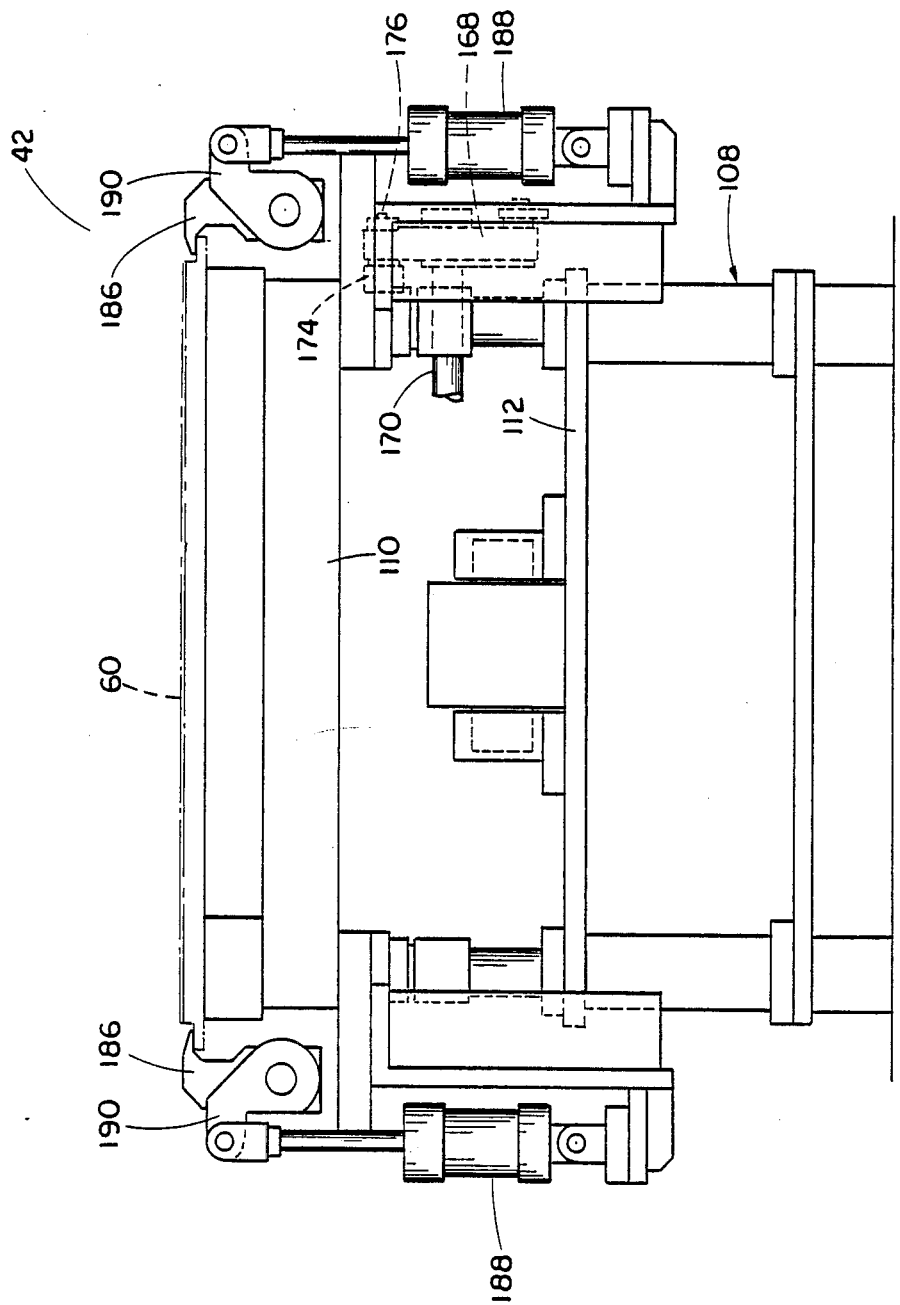
FIG. 15 is an end elevational view of the output station as seen along line 15—15 of FIG. 14.

Referring again to FIG. 4 and also to FIGS. 14 and 15, the output station 42 of the pellet collating line 36 includes a platform 154 having separate upper and lower portions 156, 158 with the upper platform portion 156 having a region 160 for supporting one of the storage trays 60. The output station 42 also includes elevating means pivotally mounted on the lower portion 158 of the platform 154 and supporting the upper portion 156 thereof above the lower platform portion 158. Further, the output station 42 includes a weighing scales 162 disposed below the upper platform portion 156 and having a plurality of upstanding posts 162A upon and from which the storage tray 60 can be placed and removed by operation of the elevating means.

More particularly, the upper and lower platform portions 156, 158 have telescoping support members 164, 166 respectively attached at each of their four corners by which arrangement the upper platform portion 156 is mounted for vertical movement relative to the lower platform portion 158. The elevating means is provided to lower and raise the upper platform portion 156 of the output station 42 in order to move the same between a lowered position in which the storage tray 60 is supported off the region 160 of the upper platform portion 156 of the output station 42 by the posts 162A of the weighing scales 162 and a raised position in which the tray 60 is supported off the scales posts 162A by the upper portion 156 of the output station platform 154.

The elevating means of the output station 42 is substantially the same at that employed at the work station 40. It includes a pair of pivotal lift arms 168 extending between the upper and lower platform portions 156, 158 at each opposite end thereof, a pair of shafts 170 each rotatably mounted on the lower platform portion 158 and extending between and attached to one of the pairs of lift arms 168, and an extendable and retractable actuator 172 coupled to one of the shafts 170 by a crank arm (not shown). Only the lift arms 168 at on side of the work station 42 are illustrated, that being shown in FIGS. 4 and 14. Each of the lift arms 168 has a roller 174 rotatably journaled by a stub shaft 176 to its upper end. The roller 174 is captured in a channel 178 attached to the upper platform portion 156 with an upper flange 180 of the channel 178 resting on the roller. In such manner, the upper platform portion 156 at each of its corners is movably supported on one lift arm 168. The lift arms 168 located on the same longitudinal sides of the work station 42 are pivotally interconnected at their lower ends by a connecting rod 182 so as to pivot in unison. Thus, upon extension and retraction of the actuator 172, the shafts 170 are respectively rotated clockwise and counterclockwise causing corresponding pivoting of the lift arms 168 and lowering and raising of the upper platform portion 156 relative to the stationary lower platform portion 158.

The output station 42, like the input station 38, also includes clamping means mounted on the platform 154 adjacent the region 160. The clamping means is in the form of a pair of shafts 184 each rotatably mounted to the upper platform portion 156 along a longitudinal side of the region 160, and a plurality of hook members 186 attached to each shaft 184. The hook members 186 pivot between unclamping and clamping positions relative to the platform region 160 upon rotation of each shaft 184. An actuator 188 is mounted on the upper platform portion 156 adjacent each shaft 184 and coupled thereto by a crank arm 190. Each actuator 188, being in the form of an air cylinder, is extendable and retractable for rotating the respective shaft 184 and thereby pivoting the hook members 186 attached thereto between the clamping and unclamping positions. In the unclamping positions of the hook members 186, a storage tray 60 on the output station platform 154 is unclamped relative to the platform region 160 permitting transfer of the tray from and to the region. On the other hand, in the clamping positions of the hook members 186, the supply tray 60 is clamped on the platform region 160.

Turning finally to FIGS. 16-26, there are schematically illustrated the operational steps performed on the pellet collating line 36 for collating pellets into enrichment zones of desired lengths. In FIG. 16, the respective input sweep head 64, gripping and measuring head 66 and output sweep head 68 are disposed in retracted positions relative to their respective stations 38-42. A pellet supply tray 58 having twenty-five rows of pellets 24 of a given enrichment thereof has been transferred to the tray supporting region 98 of the input station platform 96 by the transfer robot 62. FIG. 17 shows the upper portion 110 of the work station platform 108 being lowered relative to the input station platform 96 and supply tray 58 thereon. FIG. 18 shows operation of the input sweep head 64 in sweeping of the pellets 24 from the supply tray 58 on the input station platform 96 onto the bar-like members 116 of the work station upper platform portion 110.

FIGS. 19 and 20 show operation of the pellet alignment mechanism 138 of FIG. 12 in projecting the alignment fingers 152 upwardly through the slots 118 between the members 116 and moving the fingers 152 toward the input station 38, for example two to three inches, to ensure that the leading pellets 24 in all of the rows are aligned at their front edges. FIGS. 21 and 22 show operation of the gripping and measuring head 66 in measuring (FIG. 21) a desired length of pellets in two adjacent rows using the front edges of the leading pellets as the zero position and then separating (FIG. 22) the measured length of pellets from the remaining pellets. The desired enrichment zone being collated might be the same length as the rows of pellets on the work station 40 or the zone might shorter or longer than the pellet rows. If the zone being collated is not equal to a multiple of the row lengths, then there will eventually be a partial row remaining on the work station after the complete zone has been collated. The measuring and separating is repeated until all rows are completed.

As shown in FIG. 23, the work station upper platform portion 110 is raised relative to the input station platform 96 and the partial rows of remaining pellets are returned to the supply tray 58 on the input station 38 by operation of the output sweep head 68, although the input sweep head 64 or the gripping and measuring head 66 could alternatively be used. FIG. 24 shows the reverse operation of the output sweep head 68 in sweeping the measured length of pellets 24 from the work station 40 onto a storage tray 60 which was earlier placed by the robot 62 on the output station platform 154. Weighing of the storage tray 60 takes place both before and after the tray is filled with the measured length of pellets. The robot 62 will return the supply tray of partial pellet rows and the storage tray of pellets of measured length to the station 44 and then transfer new supply and storage trays to the respective input and output station 38, 42. The above-described operational steps are then repeated several times to collate pellets into the different enrichment zones for subsequent filling of a fuel rod.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A nuclear fuel pellet collating system, comprising:
  (a) means for positioning a plurality of pellet supply trays and a plurality of pellet storage trays, said trays adapted to support pellets in multiple rows thereof, each supply tray being adapted to support in at least one row thereon a plurality of pellets of an enrichment different from the enrichments of pellets on at least some other of said supply trays, each storage tray being adapted to support in at least one row thereon a plurality of pellets of an enrichment different from the enrichments of pellets on at least some other of said storage trays;
  (b) a pellet collating line including a pellet input station, a pellet measuring and collating work station and a pellet output station in a serial arrangement thereof;
  (c) means for transferring one at time said supply trays between said tray positioning means and said input station and for transferring one at a time said storage trays between said tray positioning means and said output station; and
  (d) pellet collating means disposed adjacent said pellet collating line and being operable for moving pellets in the at least one row thereof onto said work station from a given one supply tray on said input station, for measuring a desired length of pellets on said work station and separating the measured desired length of pellets from the remaining pellets, if there be any, for moving the measured length of pellets from said work station onto a given one storage tray on said output station, and for moving the remaining pellets, if there be any, from said work station back onto the one given supply tray on said input station.

2. The system as recited in claim 1, wherein said pellet collating means includes means disposed adjacent said input station and being operable for moving pellets in the at least one row thereof onto said work station from the given one supply tray on said input station.

3. The system as recited in claim 2, wherein said pellet moving means disposed adjacent said input station is an input sweep head disposed above said input station and adapted to move toward, away from, and along said input station for sweeping the pellets onto the work station from the one given supply tray and for moving to and from a retracted position relative to said input station.

4. The system as recited in claim 1, wherein said pellet collating means includes means disposed adjacent said work station and being operable for measuring a desired length of pellets on said work station and separating the measured length of pellets from the remaining pellets, if there be any.

5. The system as recited in claim 4, wherein said pellet measuring means disposed adjacent said work station is a gripping and measuring head disposed above said work station and adapted to move toward, away from, and along said work station for measuring and separating the pellets on said work station and for moving to and from a retracted position relative to said work station.

6. The system as recited in claim 1, wherein said pellet collating means includes means disposed adjacent said output station and being operable for moving the measured length of pellets from said work station onto the one given storage tray on said output station.

7. The system as recited in claim 6, wherein said pellet moving means disposed adjacent said output station is an output sweep head disposed above said output station and adapted to move toward, away from, and along said output station for sweeping the measured length of pellets from said work station onto the one given storage tray and for moving to and from a retracted position relative to said output station.

8. The system as recited in claim 1, wherein said input station includes:
a platform having a tray supporting region thereon; and
clamping means mounted on said platform adjacent said region and being operable to move between an unclamping position in which a tray on said input station is unclamped relative to said platform region permitting transfer of the tray from and to said region and a clamping position in which said tray is clamped on said platform region.

9. The system as recited in claim 8, wherein said clamping means includes:
a pair of shafts each rotatably mounted to said platform along one of a pair of opposite sides of said region thereon;
a plurality of hook members attached to each of said shafts for pivoting between said unclamping and clamping positions relative to said platform region upon rotation of said shafts; and
an actuator mounted on said platform adjacent each of said shafts and coupled thereto, each of said actuators being extendable and retractable for rotating said shafts and pivoting said hook members between said clamping and unclamping positions.

10. The system as recited in claim 1, wherein said output station includes:
a platform having a tray supporting region thereon; and
clamping means mounted on said platform adjacent said region and being operable to move between an unclamping position in which a tray on said output station is unclamped relative to said platform region permitting transfer of the tray from and to said region and a clamping position in which said tray is clamped on said platform region.

11. The system as recited in claim 10, wherein said clamping means includes:
a pair of shafts each rotatably mounted to said platform along one of a pair of opposite sides of said region thereon;
a plurality of hook members attached to each of said shafts for pivoting between said unclamping and clamping positions relative to said platform region upon rotation of said shafts; and
an actuator mounted on said platform adjacent each of said shafts and coupled thereto, each of said actuators being extendable and retractable for rotating said shafts and pivoting said hook members between said clamping and unclamping positions.

12. The system as recited in claim 1, wherein said output station includes:
a platform having separate upper and lower portions, said upper portion of said platform having a tray supporting region thereon;
a weighing scales disposed below said upper portion of said platform;
elevating means pivotally mounted on said lower portion of said platform and supporting said upper portion thereof above said scales, said elevating means being operable to move between a lowered position in which a tray is supported off said region of said platform upper portion by said weighing scales and a raised position in which the tray is supported off said scales by said upper portion of said platform.

13. The system as recited in claim 12, wherein said elevating means includes:
a pair of lift arms disposed at each of a pair of opposite ends of said platform and at their upper ends movable supporting said upper platform portion, each of the lift arms of said pair thereof at one platform end being pivotally connected at its lower end with the lower end of one lift arm of said pair thereof at the opposite platform end;
a pair of shafts each rotatably mounted to said lower platform portion and mounting one of said pair of lift arms between the upper and lower ends thereof; and
an actuator coupled to one of said shafts and being extendable and retractable for rotating said shafts and thereby pivoting said lift arms so as to raise and lower said upper platform portion relative to said lower portion thereof and said weighing scales.

14. The system as recited in claim 1, wherein said work station includes:

a platform having separate upper and lower portions, said upper portion of said platform having at least one elongated pellet supporting region defined therein; and elevating means pivotally mounted on said lower portion of said platform and supporting said upper portion thereof thereabove, said elevating means being operable to move to a lowered position in which said upper platform portion is lowered toward said lower portion thereof and said pellet supporting region on said upper platform portion is located at an elevation slightly below that of the one supply tray on said input station for facilitating movement of the pellets from said supply tray onto said work station, said elevating means also being operable to move to a raised position in which said upper platform portion is raised away from said lower portion thereof and said pellet supporting region on said upper platform portion is located at an elevation slightly above that of the one storage tray on said output station for facilitating movement of the pellets from said work station onto said storage tray.

15. The system as recited in claim 14, wherein said elevating means includes:

a pair of lift arms disposed at each of a pair of opposite ends of said platform and at their upper ends movable supporting said upper platform portion, each of the lift arms of said pair thereof at one platform end being pivotally connected at its lower end with the lower end of one lift arm of said pair thereof at the opposite platform end;

a pair of shafts each rotatably mounted to said lower platform portion and mounting one of said pair of lift arms between the upper and lower ends thereof; and an actuator coupled to one of said shafts and being extendable and retractable for rotating said shafts and thereby pivoting said lift arms so as to raise and lower said upper platform portion relative to said lower portion thereof.

16. The system as recited in claim: 1, wherein said work station includes:

a platform having at least a pair of elongated generally parallel spaced apart bar-like members adapted to support the pellets in the at least one row thereof on said work station and defining an open slot therebetween;

at least one alignment member; and an actuator mechanism mounted on said platform below said bar-like members and coupled to said alignment member, said actuator mechanism being operable to move toward, away from, and along said platform for respectively projecting said alignment member upwardly through said slot and above said bar-like members, retracting said alignment member downwardly through said slot and below said bar-like members, and moving said alignment member along said slot toward and away from the pellets supported by said bar-like members to locate said alignment member in contact with a leading one of the pellets in the at least one row thereof to establish a zero position for measuring of the desired length of the pellets.

17. A system for collating nuclear fuel pellets, comprising:

(a) a pellet collating line including serially-arranged pellet input, work and output stations;

(b) a plurality of mobile carts, some supporting pellet supply trays and others supporting pellet storage trays, said trays adapted to support pellets in multiple rows thereof, said pellets on a given one tray being of the same enrichment with enrichments of pellets on some trays being different from on other trays;

(c) a tray positioning station located adjacent to said pellet collating line and defining positions in which are lodged said mobile carts;

(d) tray transfer robot located between said pellet collating line and said tray positioning station, said robot being operable to transfer supply and storage trays one at a time between said respective carts at said tray positioning station and said respective input and output stations;

(e) an input sweep head disposed adjacent said input station and being operable for sweeping pellets resting in multiple rows on a given one of said supply trays at said input station from said supply tray onto said work station;

(f) a gripping and measuring head disposed adjacent said work station and being operable for measuring a desired length of pellets in the multiple rows thereof on said work station and then separating the measured desired length of pellets from the remaining pellets, if there be any;

(g) an output sweep head disposed adjacent to said output station and operable for sweeping the measured lengths of pellets from said work station onto a given one of said storage trays at said output station;

(h) one of said input sweep head, said gripping and measuring head and said output sweep head being operable for sweeping the remaining pellets, if any, in the multiple rows thereof from said work station back onto the given one of said supply trays at said input station.

18. The system as recited in claim 17, wherein said input sweep head is disposed above said input station and adapted to move toward, away from, and along said input station for sweeping the pellets in the multiple rows thereof onto said work station from the one given supply tray and for moving to and from a retracted position relative to said input station.

19. The system as recited in claim 17, wherein said gripping and measuring head is disposed above said work station and adapted to move toward, away from, and along said work station for measuring and separating the pellets on said work station and for moving to and from a retracted position relative to said work station.

20. The system as recited in claim 19, wherein said gripping and measuring head is adapted to measure and separate the pellets on said work station simultaneously in two rows thereof.

21. The system as recited in claim 17, wherein said output sweep head is disposed above said output station and adapted to move toward, away from, and along said output station for sweeping the measured length of pellets in the multiple rows thereof from said work station onto the one given storage tray and for moving to and from a retracted position relative to said output station.

22. The system as recited in claim 17, wherein said input station includes:

a platform having a tray supporting region thereon; and clamping means mounted on said platform adjacent said region and being operable to move between an unclamping position in which a tray on said input station is unclamped relative to said platform region permitting transfer of the tray from and to said region and a clamping position in which said tray is clamped on said platform region.

23. The system as recited in claim 22, wherein said clamping means includes:
a pair of shafts each rotatably mounted to said platform along one of a pair of opposite sides of said region thereon;
a plurality of hook members attached to each of said shafts for pivoting between said unclamping and clamping positions relative to said platform region upon rotation of said shafts; and
an actuator mounted on said platform adjacent each of said shafts and coupled thereto, each of said actuators being extendable and retractable for rotating said shafts and pivoting said hook members between said clamping and unclamping positions.

24. The system as recited in claim 17, wherein said output station includes:
a platform having a tray supporting region thereon; and
clamping means mounted on said platform adjacent said region and being operable to move between an unclamping position in which a tray on said output station is unclamped relative to said platform region permitting transfer of the tray from and to said region and a clamping position in which said tray is clamped on said platform region.

25. The system as recited in claim 24, wherein said clamping means includes:
a pair of shafts each rotatably mounted to said platform along one of a pair of opposite sides of said region thereon;
a plurality of hook members attached to each of said shafts for pivoting between said unclamping and clamping positions relative to said platform region upon rotation of said shafts; and
an actuator mounted on said platform adjacent each of said shafts and coupled thereto, each of said actuators being extendable and retractable for rotating said shafts and pivoting said hook members between said clamping and unclamping positions.

26. The system as recited in claim 17, wherein said output station includes:
a platform having separate upper and lower portions, said upper portion of said platform having a tray supporting region thereon;
a weighing scales disposed below said upper portion of said platform;
elevating means pivotally mounted on said lower portion of said platform and supporting said upper portion thereof above said scales, said elevating means being operable to move between a lowered position in which a tray is supported off said region of said platform upper portion by said weighing scales and a raised position in which the tray is supported off said scales by said upper portion of said platform.

27. The system as recited in claim 26, wherein said elevating means includes:
a pair of lift arms disposed at each of a pair of opposite ends of said platform and at their upper ends movable supporting said upper platform portion, each of the lift arms of said pair thereof at one platform end being pivotally connected at its lower end with the lower end of one lift arm of said pair thereof at the opposite platform end;
a pair of shafts each rotatably mounted to said lower platform portion and mounting one of said pair of lift arms between the upper and lower ends thereof; and
an actuator coupled to one of said shafts and being extendable and retractable for rotating said shafts and thereby pivoting said lift arms so as to raise and lower said upper platform portion relative to said lower portion thereof and said weighing scales.

28. The system as recited in claim 17, wherein said work station includes:
a platform having separate upper and lower portions, said upper portion of said platform having at least one elongated pellet supporting region defined therein; and
elevating means pivotally mounted on said lower portion of said platform and supporting said upper portion thereof thereabove, said elevating means being operable to move to a lowered position in which said upper platform portion is lowered toward said lower portion thereof and said pellet supporting region on said upper platform portion is located at an elevation slightly below that of the one supply tray on said input station for facilitating movement of the pellets from said supply tray onto said work station, said elevating means also being operable to move to a raised position in which said upper platform portion is raised away from said lower portion thereof and said pellet supporting region on said upper platform portion is located at an elevation slightly above that of the one storage tray on said output station for facilitating movement of the pellets from said work station onto said storage tray.

29. The system as recited in claim 28, wherein said elevating means includes:
a pair of lift arms disposed at each of a pair of opposite ends of said platform and at their upper ends movable supporting said upper platform portion, each of the lift arms of said pair thereof at one platform end being pivotally connected at its lower end with the lower end of one lift arm of said pair thereof at the opposite platform end;
a pair of shafts each rotatably mounted to said lower platform portion and mounting one of said pair of lift arms between the upper and lower ends thereof; and
an actuator coupled to one of said shafts and being extendable and retractable for rotating said shafts and thereby pivoting said lift arms so as to raise and lower said upper platform portion relative to said lower portion thereof.

30. The system as recited in claim 17, wherein said work station includes:
a platform having a multiplicity of elongated generally parallel spaced apart bar-like members adapted to support the pellets in the multiple rows thereof on said work station and defining a multiplicity of open slots therebetween;
a multiplicity of alignment members; and
an actuator mechanism mounted on said platform below said bar-like members and coupled to said alignment members, said actuator mechanism being operable to move toward, away from, and along said platform for respectively projecting said alignment members upwardly through said respective slots and above said bar-like members, retracting said alignment members downwardly through said slots and below said bar-like members, and moving said alignment members along said slots toward and away from the pellets supported by said bar-like members to locate said alignment members in contact with a leading one of the pellets in each of the multiple rows thereof to establish a zero position for measuring of the desired length of the pellets.

* * * * *